United States Patent [19]

Monforte

[11] Patent Number: 4,638,231
[45] Date of Patent: Jan. 20, 1987

[54] ROBOTIC COLLISION SENSORS AND COMPLIANCE DEVICES

[75] Inventor: Mathew L. Monforte, Hamilton, N.J.

[73] Assignee: Monforte Rebotics, Inc., Trenton, N.J.

[21] Appl. No.: 678,997

[22] Filed: Dec. 6, 1984

[51] Int. Cl.⁴ .............................................. G05B 1/06
[52] U.S. Cl. .................................. 318/640; 318/568; 901/30
[58] Field of Search ................. 318/640, 568; 901/30; 364/513

[56] References Cited

U.S. PATENT DOCUMENTS 4,146,924  3/1979  Birk et al. ...................... 318/640 X
4,217,530  8/1980  Dahm .............................. 318/640 X
4,488,241 12/1984  Hutchins ........................ 318/568 X Primary Examiner—Benjamin Dobeck
Attorney, Agent, or Firm—Sachs & Sachs

[57] ABSTRACT

A collision sensor and compliance device for use with computer controlled robotic arms adapted to have a robotic hand disposed on the distal end thereof includes a housing affixed to the robotic arm on one end with a robotic hand affixed upon the other end thereof. The front and rear walls of the housing includes triangular-shaped apertures disposed in a common plane with the apex of each of the triangularly-shaped apertures being positioned equally distant from the lower edges of each of the walls. Light emitting diodes are centrally disposed in one pair of the oppositely disposed walls with photoelectric light sensors disposed in the robotic hand support bracket. The robotic hand or support bracket includes at least a pair of bearings (preferably two pair) disposed at right angles to each other and adapted to be received and cooperate with a pair of the triangularly-shaped apertures provided in the housing. The bearings have free movement within the apertures and a spring has one end thereof affixed to the bracket or robotic hand and the other end affixed to the housing in order to urge each of the bearings to the same relative position in each of the triangularly-shaped apertures aligning the light emitting diodes and light sensing devices so that a collision of the robotic hand with an object will cause the light sensor to either provide an electrical output signal or not provide electrical output signal, thereby causing the control computer to correct for the movement of the robotic arm to avoid or guarantee the collision at the selected location.

12 Claims, 4 Drawing Figures

ROBOTIC COLLISION SENSORS AND COMPLIANCE DEVICES

BACKGROUND OF THE INVENTION

1. Field of the Invention

The present invention relates to collision sensors and compliance devices, and in particular to an apparatus suitable for providing an output signal upon collision with an object and permitting limited correction for mechanical tolerances when used on a robotic arm onto which is affixed a robotic hand.

2. Discussion of the Relevant Art

Many types of collision sensors are available and many may be suitable for use with robotic arms and hands presently in use today. Generally, these devices utilize light beams of different types or sonic transducers which are interrupted by an interfering article. Interrupting the light beam provides an indication, via electronic circuitry and cabling to the main control computer that an object has interfered with or interrupted the natural path of the sensing light beam, thereby provoking a particular response or adjustment that is made by the main computer. Although a light beam sensor or one of the sonic type may be suitable for many applications, their generally instantaneous response caused by interruption of their normally focused beam may not be suitable for use by a robotic end effector or arm. With these devices contact with an object need not occur, but only that the beam be broken to invoke a particular response by the main frame computer controlling the automatic operation of the mechanism. Sometimes it is desirable that mechanical contact between the robotic arm and an object in its path occur prior to invoking a response by the computer such as, for example, in a compliance device. This type of contact permits a certain contact threshold to occur prior to activation of the electronic response indicating such contact and this is capable of correcting small mechanical errors in location, such as, for example, that which may occur when inserting a rod into a hole if the alignment is not exact. This may have many advantages in that the threshold may be adjusted to provide the desirable contact pressure or force prior to invoking the subject response.

In many applications a combination of a light or sonic sensor together with a mechanical sensor is desirable. For example, the light sensor may be utilized to determine when an article is in position at its specific location and then a robotic arm together with its associated hand may be used to encompass or pick up the subject article. However, movement of the robotic arm into position may cause contact with articles not in their proper location and it may very well be desirable that the main frame computer be told by means of an electronic signal that there is some mechanical interference with the movement of the robotic hand.

A typical robotic hand for which the present collision sensor is ideally suited is disclosed U.S. patent application Ser. No. 580,175, issued on Feb. 16, 1984 to Mathew L. Monforte, and U.S. patent application Ser. No. 591,265, issued on Mar. 19, 1984 to Mathew L. Monforte.

The present invention overcomes the shortcomings of known devices by being small in size, light in weight and easily adaptable to robotic arms having robotic hands affixed thereon as will become apparent from the description which is to follow. The instant invention may be a unitary structure which includes a robotic hand together with a robotic collision sensor and compliance device or may be an apparatus which may have a robotic hand affixed on one end thereof with the other end affixed to a robotic arm. Thus, the instant invention is suitable for use with robotic hands presently in use today, and is capable of providing a safety feature for robotic control systems providing an electronic signal to the computer whenever an electronic arm or hand comes into contact with an article appearing in its path.

SUMMARY OF THE INVENTION

Therefore, it is an object of the present invention to provide a reliable, light weight, small collision sensor and compliance device suitable for use on robotic arms and robotic hands.

It is another object of the present invention to provide a robotic collision sensor and compliance device capable of having an adjustable threshold for operation.

It is yet another object of the instant invention to provide a robotic collision sensor and compliance device that will provide an electronic output signal when the mechanism utilizing the subject sensor is interrupted in any of its movement paths.

It is still another object of the present invention to provide a robotic collision sensor and compliance device which may be utilized in conjunction with robotic hands presently in use and/or may be utilized together with a robotic hand in one integral package.

A collision sensor and compliance device, according to the principles of the present invention, for use with the computer controlled robotic arm adapted to have a robotic hand disposed on the distal end thereof comprises; a housing disposed between the robotic arm and the robotic hand. The housing includes a device for affixing the housing to the distal end of the robotic arm, a front and rear wall and a pair of side walls. Each of the walls are provided with a pair of generally triangularly-shaped apertures; each of the apertures are disposed proximate the distal ends of each of the walls and are in a common plane. The apex of the triangularly-shaped apertures are positioned equally distant from the lower edges of each of the walls. A light emitting device is centrally disposed in one pair of the oppositely disposed walls and an attaching device is disposed proximate the distal end of the robotic hand for affixing the robotic hand to the housing. The attaching device includes a bracket for affixment to the robotic hand and includes at least a pair of bearings disposed at right angles to each other which are adapted to be received and cooperate with a pair of the triangularly-shaped apertures provided in the housing; the bearings have free movement within the apertures. A spring having one end thereof affixed to the bracket and the other end thereof affixed to the housing urges each of the bearings to the same relative position in each of the triangularly-shaped apertures. A light sensing device, is disposed in the bracket in alignment with the light emitting device disposed in a pair of the housing walls, provides an electrical signal when aligned therewith and does not provide an electrical signal when misaligned. The main computer operatively coupled to the light sensing means modifies the movement of the computer controlled robotic arm to correct for the movement of the robotic arm responsive to the electrical signal or the lack thereof.

The foregoing and other objects and advantages will appear from the description to follow. In the description reference is made to the accompanying drawing which forms a part hereof, and which is shown by way of illustration its specific embodiment in which the invention may be practiced. This embodiment will be described in sufficient detail to enable those skilled in the art to practice the invention, and it is to be understood that other embodiments may be utilized and that structural changes may be made without departing from the spirit and scope of the invention. The following detailed description is, therefore, not to be taken in a limiting sense and the scope of the present invention is best defined by the appended claims.

BRIEF DESCRIPTION OF THE DRAWINGS

In order that the invention may be more fully understood it will now be described, by way of example, with reference to the accompanying drawings in which.

DESCRIPTION OF THE PREFERRED EMBODIMENTS

Figure 2:
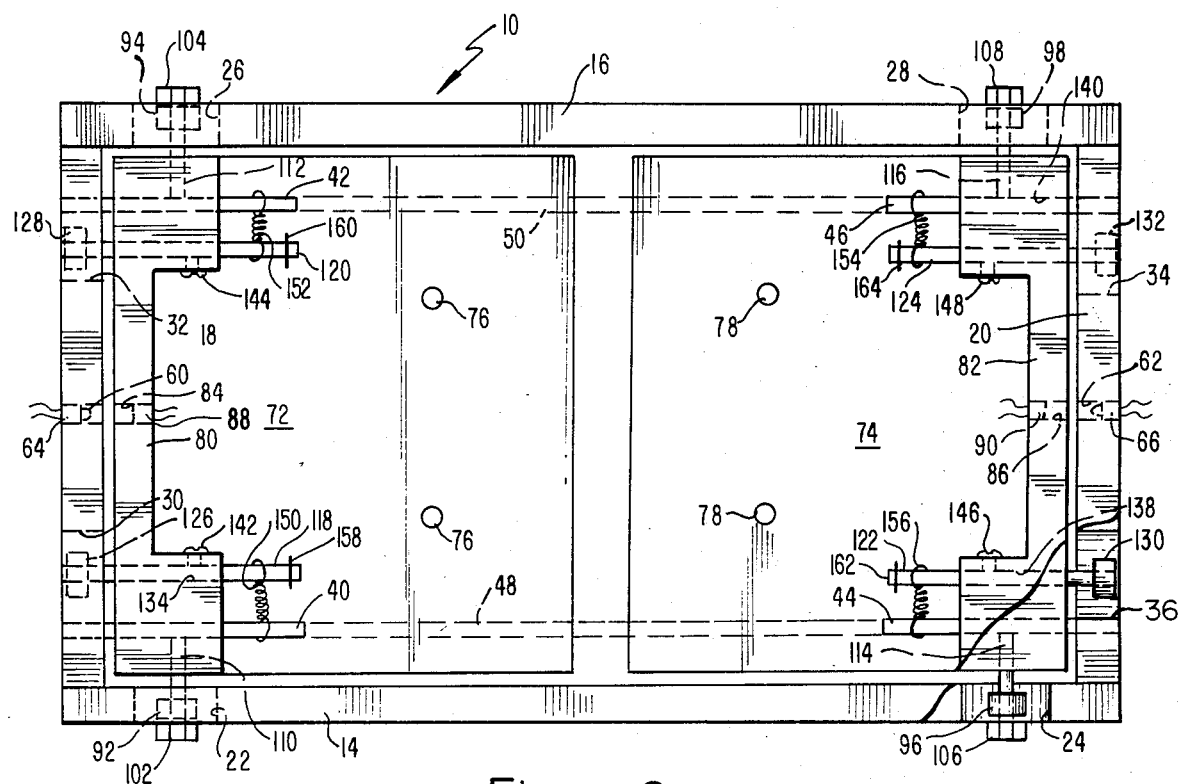
FIG. 2 is a slightly enlarged top plan view of the robotic collision sensor and compliance device taken generally along the line 2—2 of FIG. 1.
Figure 1:
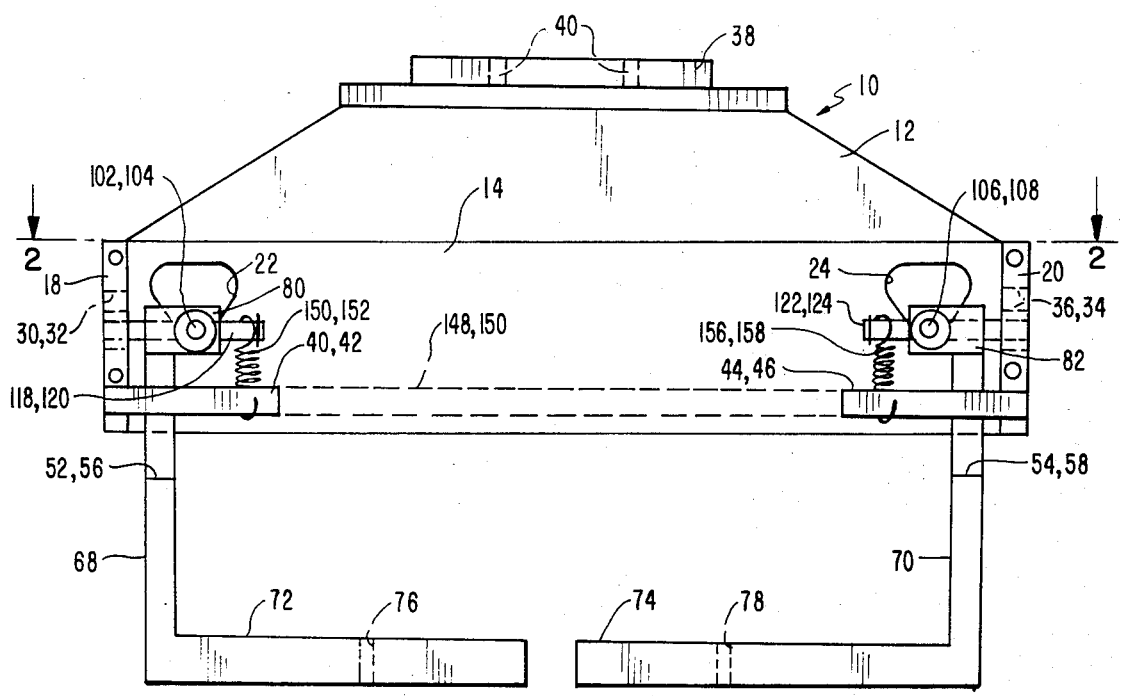
FIG. 1, is a front view in elevation of the robotic collision sensor and compliance device, according to the principles of the present invention.

Referring now to the figures, and in particular, to FIGS. 1 and 2, there is shown a robotic collision sensor and compliance device 10, according to the principles of the present invention. FIG. 1 is a front view in elevation and discloses a housing 12 which includes a front wall 14 and a rear wall 16 with a pair of side walls 18 and 20. Each of the walls, 12, 14, 16, 18 and 20 are provided with a pair of triangularly-shaped apertures 22, 24, 26, 28, 30, 32, 34 and 36 whose function will be described hereinafter. The front wall 14 is shown as being transparent so that the disposition of the inner components may be more readily observed together with FIG. 2. The housing 12 is provided on the upper portion thereof with a mounting plate 38 having a plurality of apertures therein 40, suitable for affixing the robotic collision sensor 10 to a robotic arm, not shown, in a conventional manner.

The side walls 18 and 20 are provided with a pair of pins 40, 42, 44 and 46, respectively, which are affixed in the end wall in a conventional manner, such as force fitting or threading or may consist of a pair of rods, indicated by the broken lines 48 and 50 which functions to support and/or rigidize the frame 12 by reinforcing the end walls 18 and 20. The rods 48 and 50, or pins 40, 42, 44 and 46 extend through semi-circularly-shaped openings, more clearly shown in conjunction with FIG. 4 which discloses the alternative embodiment of the instant invention. Centrally disposed through apertures 60 and 62 are provided in side walls 18 and 20, respectively, into which are inserted light emitting diodes (LED's) 64 and 66, respectively which are energized from the main frame computer supply, not shown, in a conventional manner.

A pair of generally L-shaped brackets (when frontally viewed), 68 and 70 are provided with a generally horizontally disposed elongated portions 72 and 74, respectively, which has disposed therein apertures 76 and 78, respectively suitable for affixment to the mounting bracket of a robotic hand, not shown. The upper or shorter portions 80 and 82 of brackets 68 and 70, respectively are provided with centrally disposed apertures 84 and 86, respectively into which are affixed, in a conventional manner, photoelectric transistors 88 and 90 which are coupled to the main frame computer, now shown, in a conventional manner and are positioned in alignment with LED's 64 and 66 so that when the collision sensor 10 is in its normal, steady state condition (not colliding with any object) the LED's and photoelectric transistors are in direct alignment with the light being concentrated, via apertures 60, 62, 84 and 86 emanating from the LED's 64 and 66 towards photoelectric transistors 88 and 90, respectively.

Needle roller bearings 92, 94, 94, 96 and 98 are journaled on the clear portion of threaded bolts or screws, 102, 104, 106 and 108 which are then threaded into threaded apertures 110, 112, 114 and 116, respectively in order that the needle roller bearings (NRB) 92, 94, 96 and 98, are respectively positioned in the triangularly-shaped apertures 22, 26, 24 and 28. Rods, 118, 120, 122 and 124 having needle roller bearings 126, 128, 130 and 132 disposed on one end thereof, respectively, is received in apertures 134, 136, 138 and 140, respectively provided in the shorter portion 80 and 82 of L-shaped brackets 68 and 70 and is held into place by set screws 142, 144, 146 and 148, respectively. (See FIG. 2) When in position, needle roller bearings 126, 128, 130 and 132 are disposed within triangularly-shaped apertures 30, 32, 36 and 34 respectively, Springs, preferably of the coil type 150, 152, 154 and 156 affixed on rod 118, 120, 122 and 124 respectively and retained thereon by C-shaped washers 158, 160, 162, and 164, respectively. The other end of springs 150, 152, 154 and 156 is connected to pin 40, 42, 44 and 46, respectively thereby urging the needle roller bearings into the lowest (apex) point of each of the triangularly-shaped apertures causing the LED's and photoelectric transistors to be in alignment as mentioned earlier. The springs 150, 152, 154 and 156 may be selected to provide preselected amounts of tension thereby requiring a predetermined amount of force before activation of the collision sensor.

Figure 3:
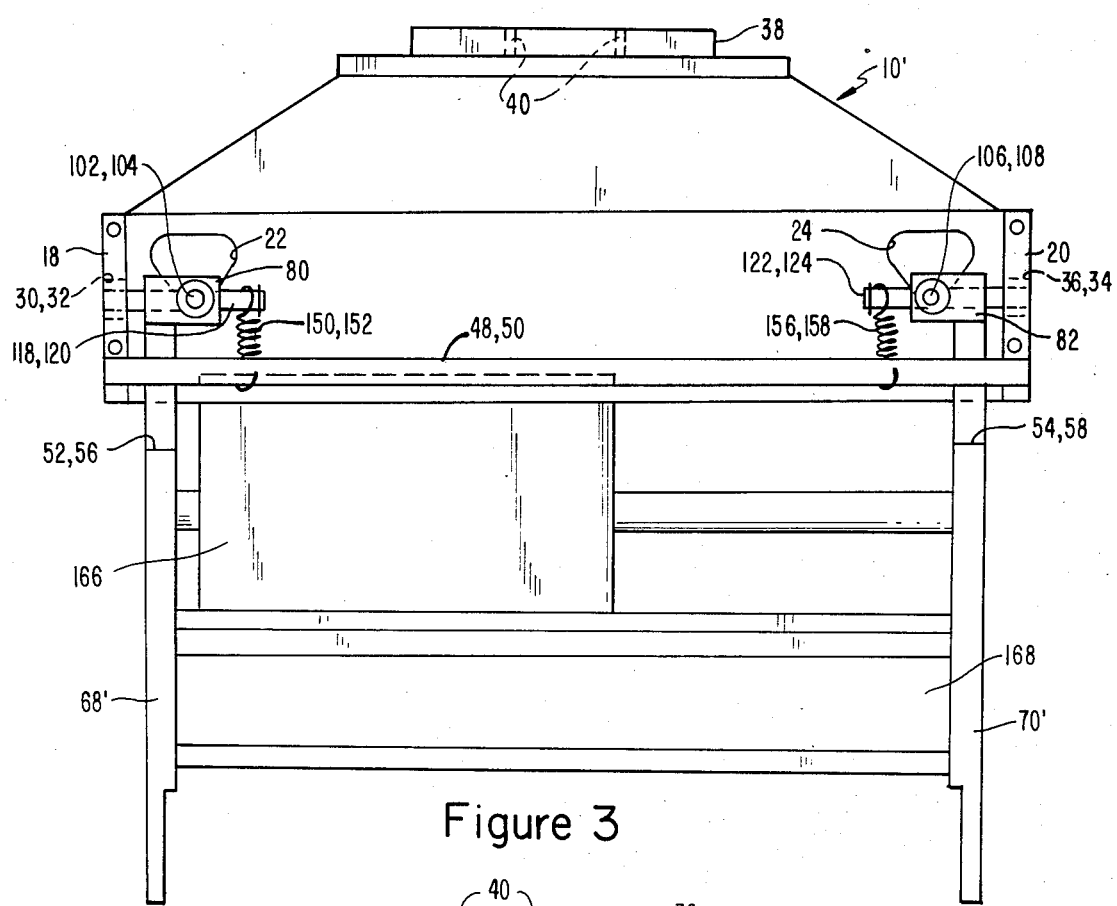
FIG. 3, is a front view in elevation of an alternative embodiment of a robotic collision sensor and compliance device and a robotic hand in a unitary configuration.
Figure 4:
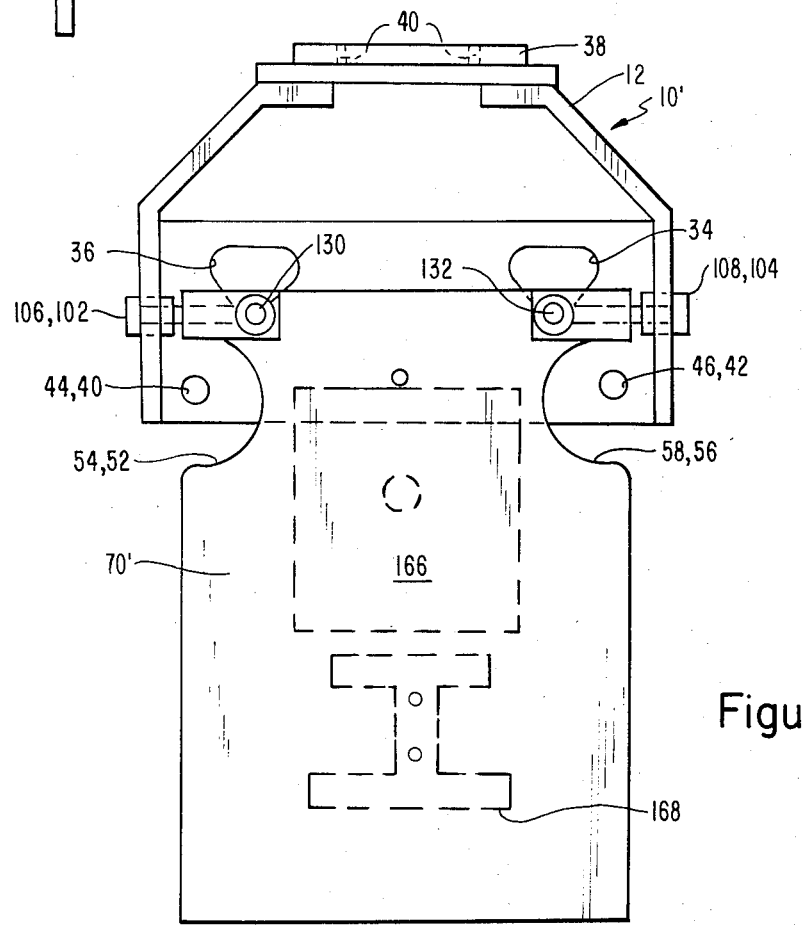
FIG. 4, is an end view in elevation of the combined robotic collision sensor and compliance device and the robotic hand shown in FIG. 3.

Referring now to FIGS. 3 and 4 which disclose the alternative embodiment 10' of the collision sensor with an integrally mounted robotic hand. In FIGS. 3 and 4 like numerals refer to like components and a primed numeral indicates a component which is very similar to that used in the embodiment shown in FIGS. 1 and 2 and for clarity, indicates the position of similar elements in the alternative embodiment.

The configuration of the alternative embodiment is essentially similar to that of the embodiment described in Figures 1 and 2 with L-shaped brackets 68 and 70 being replaced by brackets or fingers 68' and 70' respectively. Brackets or fingers 68' and 70' are constructed without the elongated portions 72 and 74 being bent horizontally and form the fingers of the robotic hand which is described in detail in the earlier cited patents to the same inventor.

In the alternative embodiment disclosed in FIGS. 3 and 4 there is no need to provide this elongated portion since there is no need to make connection to a robotic hand since it is included in the same housing. The driving fluid cylinder 166 with the T-shaped bar 168 and the functioning thereof is disclosed in the earlier patents cited.

In operation, the embodiment of the robotic collision sensor and compliance device shown in FIGS. 1 and 2 may be affixed to a robotic arm, not shown, in the same manner that a conventional robotic hand is affixed thereto by means of the mounting plate 38 and the apertures 40 provided therein, in a conventional manner. The robotic hand thus removed from the robotic arm may be affixed to the elongated portion 72 and 74 brackets 68 and 70, respectively in the same manner that the robotic hand was affixed to the robotic arm, thereby providing the collision sensing and compliance abilities disclosed in the instant invention.

The embodiment disclosed in FIGS. 3 and 4 may be affixed to the robotic arm directly by the means of mounting plate 38 and apertures 40, in a conventional manner and of course, since the robotic hand is an integral part thereof, no further connections need be made and the collision sensor and compliance device will function in the same manner. If the robotic hand were to come into contact with an object making contact with any of the edges or surfaces of the robotic hand namely, brackets 68, 70, 68' or 70' thereby causing misalignment of the photoelectric transistors 88 and 90 with their respective light emitting diodes 64 and 66, the photoelectric transistors will be caused to change state and/or provide a lower output voltage than when in normal perfect alignment. This will be recognized by the electronic sensing circuitry (end circuit) and thus, provide a signal to the main frame computer, not shown, which can react or modify the program so that the robotic arm can be halted, moved to a new position, react in any other manner set forth in the program of the main computer. If the robotic hand were inserting an object into a hole or slot then a sloped or chamfered edge could be used to guide the object to its "home" position since the available compliance provided by the present device permits a threshold (some misalignment) before providing an output signal.

A typical light emitting diode suitable for use in the instant invention is that manufactured by Honeywell Opto Electronics, Richardson, Tex., known as model number SZ1450-4L and a phototransistor manufactured by the same manufacturer known as Model No. SD1440-4L.

Hereinbefore has been disclosed a reliable, simple, light weight robotic collision snesor and compliance device which may be combined with a robotic hand to provide sensing and compliance functions. It is obvious that the tension of the springs can be modified or adjusted as desired to provide various amounts of compliance, e.g. requiring different preselected amounts of contact pressure before a changed output signal is provided by the present collision sensor and compliance device. It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention, what is claimed is:

1. A collision sensor and compliance device for use with a computer controlled robotic arm adapted to have a robotic hand disposed on the distal end thereof, comprising:
   (a) housing means disposed between said robotic arm and said robotic hand, said housing means having;
      (i) affixment means for affixing said housing means to the distal end of said robotic arm,
      (ii) a front and rear wall and a pair of side walls, each of said walls being provided with a pair of generally triangularly-shaped apertures, each of said apertures being disposed proximate the distal ends of each of said walls and in a common plane, the apex of each said triangularly-shaped aperture being positioned equidistant from the lower edges of each of said walls,
      (iii) light emitting means centrally disposed in one pair of said oppositely disposed walls;
   (b) means disposed proximate the distal end of said robotic hand for attaching said robotic hand to said housing means, said attaching means having;
      (i) bracket means for affixment to said robotic hand, said bracket means including at least a pair of bearing means disposed at right angles to each other adapted to be received and cooperate with a pair of said triangularly-shaped apertures provided in said housing, and bearing means having free movement within said apertures,
      (ii) spring means having one end thereof affixed to said bracket means and the other end thereof affixed to said housing means for urging each of said bearing means to the same relative position in each of said apertures,
      (iii) light sensing means disposed in said bracket means in alignment with said light emitting means disposed in a pair of said housing walls for providing an electrical signal when aligned therewith and not providing an electrical signal when misaligned therewith.

2. A collision sensor and compliance device according to claim 1 wherein said bearing means includes a needle roller bearing disposed on the distal end of a shaft, the diameter of said bearing being approximately equal to the diameter provided at the apex of said triangularly-shaped apertures.

3. A collision sensor and compliance device according to claim 1 wherein said light emitting means is a light emitting diode and said light detector is photoelectric transistor.

4. A collision sensor and compliance device according to claim 2 wherein said spring means is a coil spring and said one end of each said springs are affixed to the end of said shaft remote from said bearing means.

5. A collision sensor and compliance device according to claim 4 further including a pair of rod means extending between and affixed to said side walls, the other end of each said springs being affixed thereto providing means for biasing said bearing means to the apexes of said triangularly-shaped apertures.

6. A collision sensor and compliance device according to claim 1 wherein at least a pair of bearing means comprises two said pairs of bearing means.

7. A robotic hand having a collision sensor and a compliance device disposed therein for removable affixment on the distal end of a computer controlled robotic arm, comprising:
   (a) housing means having disposed therein said robotic hand and said collision sensor, said housing means having;

(i) affixment means for affixing said housing means to the distal end of said robotic arm, (ii) a front and rear wall and a pair of side walls, each of said walls being provided with a pair of generally triangularly-shaped apertures, each of said apertures being disposed proximate the distal ends of each of said walls and in a common plane, the apex of each said triangularly-shaped aperture being positioned equally distant from the lower edges of each of said walls; and (iii) light emitting means centrally disposed in one pair of said oppositely disposed walls; and (b) means disposed proximate the distal end of said robotic hand for attaching said robotic hand to said housing means, said robotic hand attaching means including:

(i) at least a pair of bearing means disposed at right angles to each other adapted to be received and cooperate with a pair of said triangularly-shaped apertures provided in said housing, said bearing means having free movement within said apertures, (ii) spring means having one end thereof affixed to said robotic hand and the other end thereof affixed to said housing means for urging each of said bearing means to the same relative position in each of said apertures, and (iii) light sensing means disposed in said robotic hand in alignment with said light emitting means disposed in a pair of said housing walls for providing an electrical signal when aligned therewith and not providing an electrical signal when misaligned therewith.

8. A collision sensor and compliance device according to claim 7 wherein said bearing means includes a needle roller bearing disposed on the distal end of a shaft, the diameter of said bearing being approximately equal to the diameter provided at the apex of said triangularly-shaped apertures.

9. A collision sensor and compliance device according to claim 7 wherein said light emitting means is a light emitting diode and said light detector is photoelectric transistor.

10. A collision senor and compliance device according to claim 7 wherein said spring means is a coil spring and said one end of each said springs are affixed to the end of said shaft remote from said bearing means.

11. A collision sensor and compliance device according to claim 7 further including a pair of rod means extending between and affixed to said side walls, the other end of each said springs being affixed thereto providing means for biasing said bearing means to the apexes of said triangularly-shaped apertures.

12. A collision sensor and compliance device according to claim 7 wherein at least a pair of bearing means comprises two of said pairs of bearing means.

* * * * *